INVENTOR.
LAURENCE E. ORNE

BY
Wade Koontz
and
George Fine
ATTORNEYS

INVENTOR.
LAURENCE E. ORNE
BY Wade Koontz
George Fine
ATTORNEYS

United States Patent Office 3,314,020
Patented Apr. 11, 1967

3,314,020
SIGNAL-TO-NOISE ENHANCING AMPLIFIER
Laurence E. Orne, 4 Enbar Circle,
Billerica, Mass. 01821
Filed June 3, 1964, Ser. No. 372,433
5 Claims. (Cl. 330—96)

The invention described herein may be manufactured and used by or for the United States Government for governmental purposes without payment to me of any royalty thereon.

This invention relates to an amplifier for signal to noise enhancement, and more particularly to an amplifier modulated in accordance with an input signal wherein the information content of the signal is amplified to a considerably greater extent than the noise impressed on aforesaid input signal.

There has been a considerable limitation in the recovery of the information content of a signal because of the noise impressed upon the signal during the period the signal is being processed. For example, when the information content is impressed upon a signal for transmission purposes, noise also is added thereto. When the transmitted signal is received, again there may be additional noise added at the input of the receiver system. Therefore, it is extremely desirable to provide an amplifier which permits considerable enhancement of the information content from a noisy signal.

With the present invention integrated with existing tropospheric scatter teletype links, it would permit hard copy to be printed with the signal level only 3 db above noise. Present link designs require a stronger signal or a signal about 8 db above noise. A 5 db improvement is equivalent to an increase in transmitter power of at least threefold, or equally important, the recovery of much information being lost in the receiver system. Thus the present invention provides a signal-to-noise enhancement which eliminates the necessity for utilizing higher power transmitters and lower noise receivers.

In digital data and teletype communication systems, when signal levels fall to less than 8 db above system noise, error rates become excessive and reception unreliable. The amplifier of the present invention is capable of recovering a usable voice-frequency by teletype signal from signal-to-noise conditions as low as 3 db, effectively bringing unusable signals far enough above noise to yield teletype copy whose accuracy is better than 98% or better. It is applicable not only to single channel but also to multiplex signals.

The modulated amplifier of the present invention operates on signals as low as −50 dbm, and for each 1 db increment in signal level at its input, it will put out increments from 4 to 6 db to provide expansion without distortion. Thus an initial signal-to-noise condition of 3 db will be increased to from 12 to 18 db. Response to changes in signal level is essentially instantaneous enabling accurate rendition of a multi-level digital signal or a rapidly-varying analog signal such as speech.

An object of the present invention is to provide an amplifier to enhance the information content of a signal.

A further object of the present invention is to provide an amplifier wherein the signal-to-noise ratio of the input signal is substantially reduced at the output thereof.

A still further object of the present invention is to provide an amplifier wherein the information content of the input signal is amplified to a considerably greater extent than the noise associated with aforesaid input signal.

The novel features which I believe to be characteristic of my invention are set forth with particularity in the appended claims. My invention itself, however, together with further objects and advantages thereof can best be understood with reference to the following description taken in connection with the accompanying drawings in which:

Figure 1:
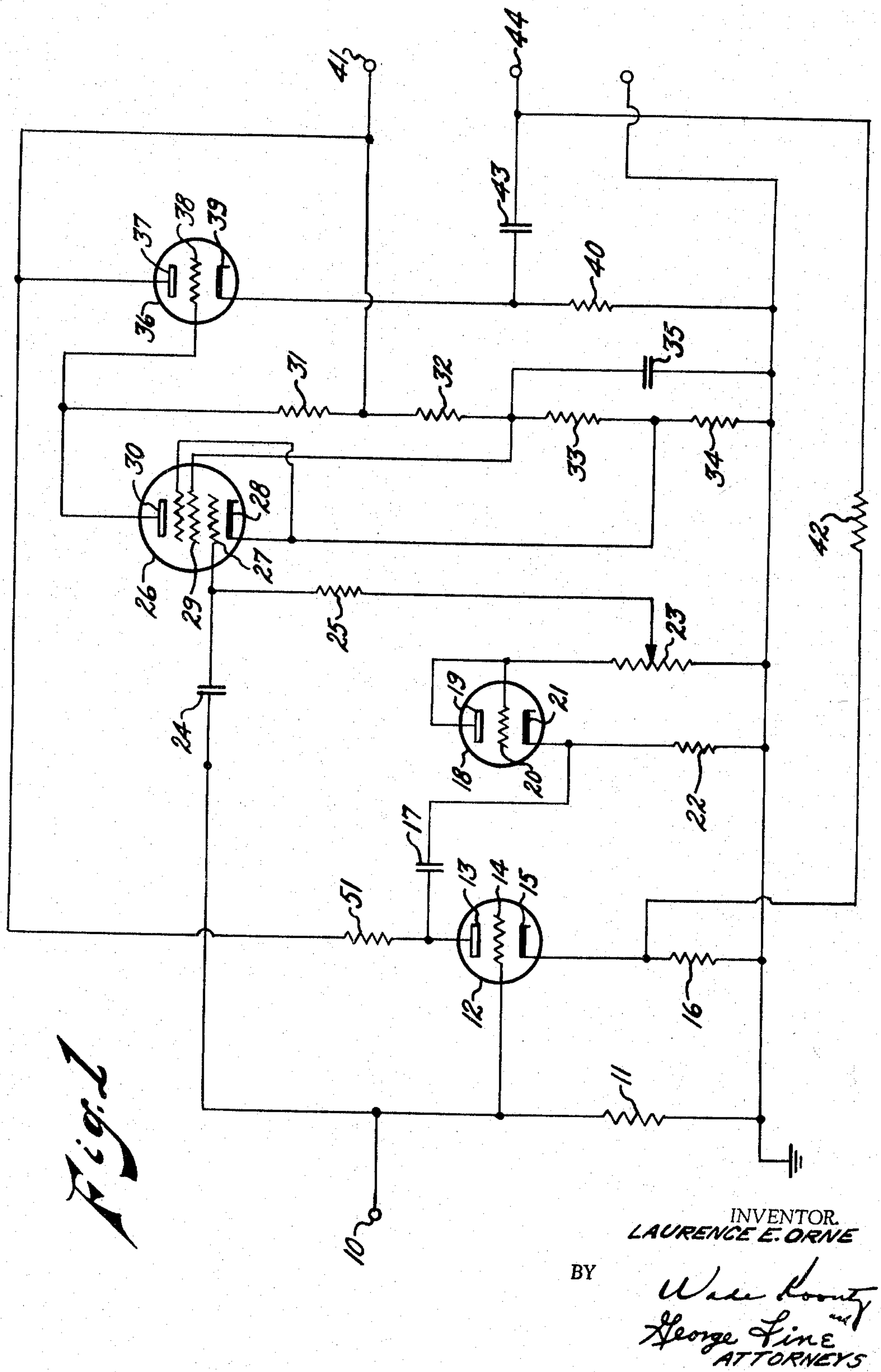
FIGURE 1 shows a schematic diagram of a preferred embodiment of my invention.

Now referring in detail to FIGURE 1, there is shown terminal 10 which receives an input signal having noise and information content such as speech or digital data. The input signal is simultaneously received by control grid 14 of amplifier triode 12 and to control grid 27 of amplifier pentode 26.

The cathode bias of triode amplifier 12 is provided by the signal and D.C. current drop across resistor 16. It is to be noted that cathode resistor 16 is not bridged by a capacitor and is utilized for degeneration purposes. The voltage for plate 13 is supplied from positive voltage source 41 by way of resistor 51.

Electron discharge device 18 is connected as a diode by interconnecting plate 19 and grid 20. Cathode 21 is connected to ground by way of resistor 22. Triode amplifier 12 is A.C. coupled to cathode 21 of electron discharge device 18 by way of capacitor 17. Potentiometer 23 is arranged between ground and plate 19 of electron discharge device 18 and the variable arm thereof is connected to control grid 27 of pentode 26 by way of resistor 25.

Pentode 26 is a variable mu tube and is arranged so that plate 30 is connected to ground by way of resistors 31, 32, 33 and 34, and capacitor 35 is shunted between the junction of resistors 32 and 33 and ground. The voltage for plate 26 is supplied from positive voltage source 41 by way of resistor 31. The suppressor grid is connected directly to cathode 28. Screen grid 29 is connected between the junction of resistors 32 and 33. Cathode 28 is connected between the junction of resistors 33 and 34 and thereby has a voltage impressed thereupon in the value of approximately 0.5 volt thereby supplying a reference voltage.

Cathode follower 36 receives the output directly from plate 30 of pentode 26 by way of its control grid 38. Cathode 39 is connected to ground by way of resistor 40. Plate 37 is supplied with a voltage from positive voltage source 41. Terminal 44 receives an output signal from cathode 39 by way of capacitor 43. Terminal 44 is interconnected by way of resistor 42 to cathode 15 of triode amplifier 12 to supply a feedback thereto.

In the operation of the preferred embodiment of the invention illustrated in FIGURE 1, the input containing signal and noise is applied to triode amplifier 12 and pentode 26 simultaneously. Noise by itself is insufficient in magnitude to be amplified by either triode 12 or pentode 26 because of their biasing arrangement. The input signal such as representative of digital data or speech is then passed through triode 12 and the amplified signal is coupled to cathode 21 of electron discharge device 18 by way of capacitor 17. The detected signal is developed across potentiometer 23 which is applied from the variable arm thereof to control grid 27 of pentode 26 by way of resistor 25. This circuit functions as a gate control to provide a modulating negative grid voltage for pentode 26. It is to be noted that the only capacitor utilized in the circuits associated with triode 12 and electron discharge device 18 is one utilized for coupling an A.C. signal therebetween thus permitting fast attack and decay time without limitations in charge and discharge time introduced by capacitance, the detected signal is representative exclusively of the signal, and not of the noise as the noise assumes a D.C. mean value of zero. The combination of amplifier 12 and electron discharge device 18 with its associated circuit is carefully arranged to be free of phase shift.

The gating signal has two important characteristics, one being that it is solely representative of the signal content and the second that the delays and storage problems introduced by the utilization of capacitors are eliminated permitting among other features a very fast attack and decay time.

Figure 2:
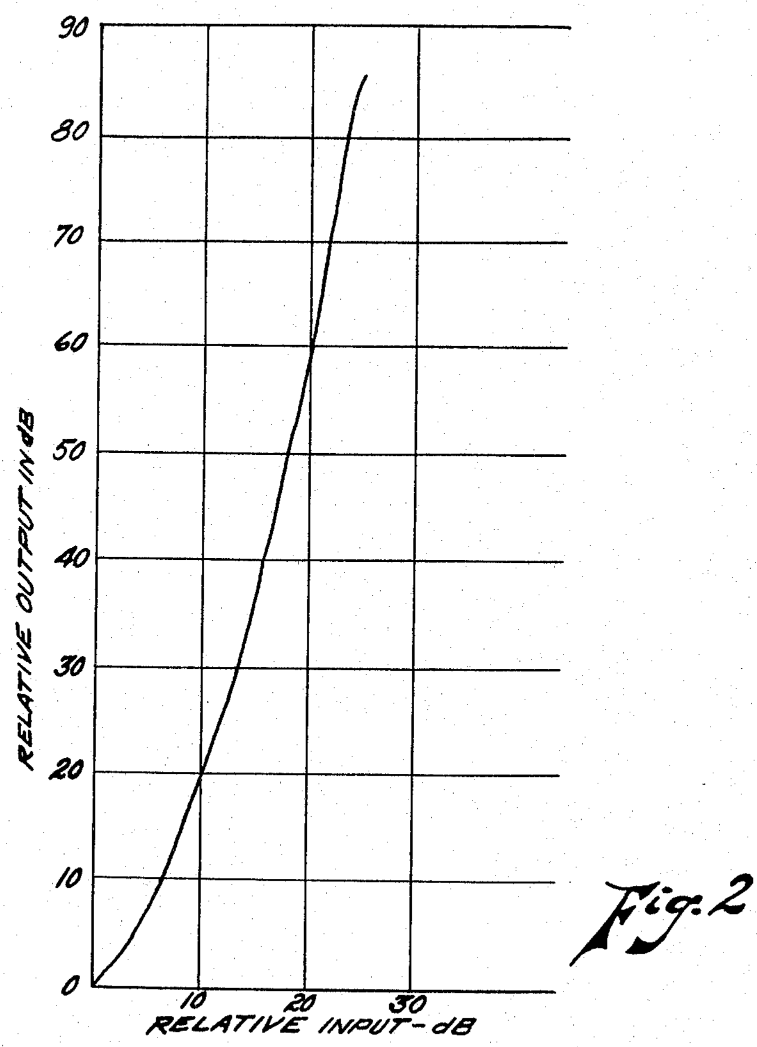
FIGURE 2 shows a curve of the input-output characteristic of the signal-to-noise enhancing amplifier of FIGURE 1.

Pentode 26 is so adjusted in voltage and bias that the gain thereof is at a minimum without an input signal thereto. Still further, it is also adjusted so that on receiving negative D.C. voltage at control grid 27 the gain thereof is increased so that for each 1 db increment of signal level at its input there will be a corresponding 4—*b* db increment at its output. When an input is received at control grid 27 by way of capacitor 24, a negative D.C. voltage representative only of the information content of the input is also simultaneously received thereat (as previously described). The D.C. signal controls the gain of pentode 26 so that the input thereto consisting of noise, and signal content is amplified in accordance therewith. Since the D.C. signal is representative only of the signal content of the input then that signal content is amplified to a considerably greater extent than the noise portion and at plate 30 of pentode 26 there appears an output whose signal to noise ratio is much less than the signal-to-noise ratio of the input thereto. For example, with a signal-to-noise ratio of the input in the vicinity of 8 db, the signal-to-noise ratio of the output is 3 db. Thus pentode 26 is modulated exclusively in accordance with a D.C. signal representative of signal content of the input. With no input the gain thereof is minimum and with increased input, the gain increases as indicated in the curve of FIGURE 2.

The output of pentode 26 is coupled directly to cathode follower 36 which provides an output at terminal 44 by way of coupling capacitor 43. The output from terminal 44 is applied to cathode 15 of triode 12 by way of resistor 42 to supply feedback thus providing triode 12 with means to improve its amplifying characteristics. It is to be noted that triode 12 also has been provided with cathode resistor 16 to provide degeneration thereto.

In the operation of the above-described amplifier, it is emphasized that the gate circuit which includes triode 12 and electron discharge tube 18 and their associated components operate to modulate pentode 26 and the aforesaid gating circuit is so arranged as to be virtually unresponsive to the noise content of a signal but responds only to the information content. The aforesaid gating circuit is also free of any phase shift.

It is also emphasized that there is an expansion of the signal between the input to pentode 26 to the output thereof as previously indicated. The utilization of this expansion makes the amplifier of the present invention adaptable to multichannel teletype service over a voice grade communication network for improvement of s/n ratios. The input-output characteristic of the signal-to-noise enhancing amplifier showing expansion is illustrated in FIGURE 2.

Figure 3:
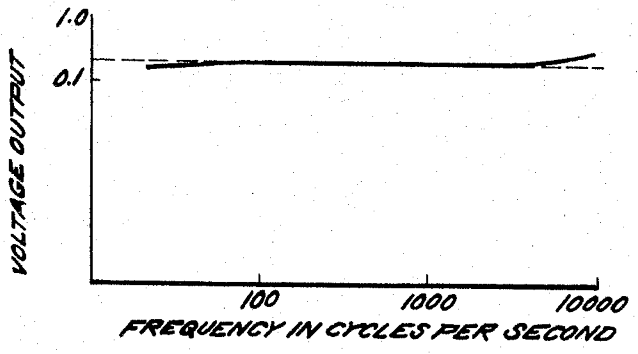
FIGURE 3 shows the frequency response characteristic of FIGURE 1.

It is to be noted that in normal expander circuits from 6 db to 15 db cause envelope delay distortion and must be removed if digital data circuits are transmitted over the facilities. The expansion provided by the present invention is free of envelope delay distortion as a result of the gating and modulating of pentode 26 plus the degeneration and feedback provided for triode 12. Another important aspect of the invention resides in the frequency response as illustrated in FIGURE 3 wherein the input signal is faithfully reproduced in the output without distortion in spite of the expansion.

What is claimed is:

1. An amplifier modulated solely by the information content of a noisy input signal thereto to provide an improved signal-to-noise ratio at the output thereof comprising a first amplifier including control grid, cathode and plate, said first amplifier having means producing feedback at said cathode, and receiving said input signal at said control grid, a detector circuit consisting of a triode connected as a diode and a resistance, said triode including plate and cathode, said detector being coupled to said first amplifier exclusively by a capacitor, the combination of said first amplifier and said detector operating to produce at the output thereof a D.C. signal varying solely in magnitude in accordance with said information content of said input signal, a second amplifier including a control grid, plate and cathode, said second amplifier cathode being exclusively connected to ground by a resistor, the gain of said second amplifier being minimum without said input signal and being increased solely in accordance with an increase of a D.C. voltage applied to said second amplifier control grid, said second amplifier control grid receiving simultaneously said input signal and the output from said detector, a cathode follower directly receiving the output from said second amplifier, and a resistance interconnecting the output of said cathode follower and said cathode of said first amplifier.

2. An amplifier modulated solely by the information content of a noisy input signal to provide an improved signal-to-noise ratio at the output thereof comprising a first amplifier receiving said input signal and including a control grid, cathode and plate, said cathode having only a resistor connected to ground therefrom to provide degeneration, a detector consisting of a triode connected as a diode and a resistance, said detector being coupled to the output of said first amplifier exclusively by a capacitor and a potentiometer providing the output for said detector, the combination of said first amplifier and said detector being free of phase shift and operating to provide a negative D.C. output being solely representative of said information content of said noisy input signal, a second amplifier receiving simultaneously the output of said detector and said noisy input signal and including control grid, cathode and plate, said second amplifier cathode being connected to ground solely by a resistance, the gain of said second amplifier being adjusted to be a minimum without signal input and to increase in accordance with an increasing negative D.C. voltage applied to said control grid thereof, a cathode follower being connected directly to the output of said second amplifier, said output being 180° out phase with said input to said second amplifier, and a resistance interconnecting the output of said cathode follower and said cathode of said first amplifier.

3. An amplifier modulated solely by the information content of a noisy input signal to provide an improved signal-to-noise ratio at the output thereof comprising a first amplifier receiving said input signal and including a control grid, cathode and plate, said cathode being connected to ground exclusively by a resistor to provide degeneration, a detector consisting of a triode connected as a diode and a resistor, said detector being coupled to said first amplifier only by a capacitor and a potentiometer providing the output for said detector, the combination of said first amplifier and said detector being free of phase shift and operating to provide a negative D.C. output being solely representative of said information content of said noisy input signal, a second amplifier having control grid, cathode and plate, said second amplifier cathode being connected to ground only by a resistor, said second amplifier control grid receiving simultaneously said noisy input signal and said negative D.C. output, said second amplifier having minimum gain without signal input and increasing gain with increasing magnitude of said negative D.C. output being received at said second amplifier control grid, a cathode follower receiving the output directly from the said plate of said second amplifier, and a resistance interconnecting the output from said cathode follower and said cathode of said first amplifier to provide feedback thereto.

4. An amplifier modulated solely by the information content of a noisy input signal to provide an improved signal-to-noise ratio at the output thereof comprising a first amplifier receiving said input signal and including a control grid, cathode and plate, said cathode being connected to ground exclusively by a resistor to provide degeneration, a detector consisting of a triode connected as a diode and a resistor, said detector being coupled to said first amplifier only by a capacitor, the combination of said first amplifier and said detector being free of phase shift and operating to provide a negative D.C. output signal being solely representative of said noisy input signal, a resistance network providing the output for said detector, a second amplifier including control grid, cathode and plate and having the gain thereof at minimum without signal input, said second amplifier cathode connected to ground exclusively by a resistor and being biased at a preselected reference voltage to provide increasing gain upon application of an increasing negative D.C. voltage to said second amplifier control grid, said control grid of said second amplifier receiving simultaneously said noisy input signal and said negative D.C. output signal from said resistance network, a cathode follower receiving the output of said second amplifier, and a feedback resistor interconnecting the output of said cathode follower in said cathode of said first amplifier.

5. An amplifier modulated solely by the information content of a noisy input signal to provide an improved signal-to-noise ratio at the output thereof comprising a first amplifier receiving said input signal and including a control grid, cathode and plate, said cathode being connected to ground exclusively by a resistor to provide degeneration, a detector consisting of a triode connected as a diode and a resistor, said detector being coupled to said first amplifier only by a capacitor, a resistance network providing the output for said detector, the combination of said first amplifier and said detector being free of phase shift and operating to provide a negative D.C. output signal being solely representative of said information content of said noisy input signal, a second amplifier including control grid, cathode and plate, said second amplifier cathode being connected to ground exclusively by a resistor and said second amplifier being arranged to modulate the input signal thereto in accordance with a D.C. negative voltage applied to said second amplifier control grid, said second amplifier of said second amplifier receiving simultaneously said noisy input signal and said output signal from said resistance network, a cathode follower receiving the output from said second amplifier, and a feedback resistor interconnecting the output from said cathode follower and said cathode of said first amplifier.

No references cited.

ROY LAKE, *Primary Examiner.*

J. MULLINS, *Assistant Examiner.*